Nov. 26, 1957  G. R. CARLSON ET AL  2,814,215
FIXTURE FOR A BORING MACHINE OR THE LIKE
Filed April 19, 1955  2 Sheets-Sheet 1
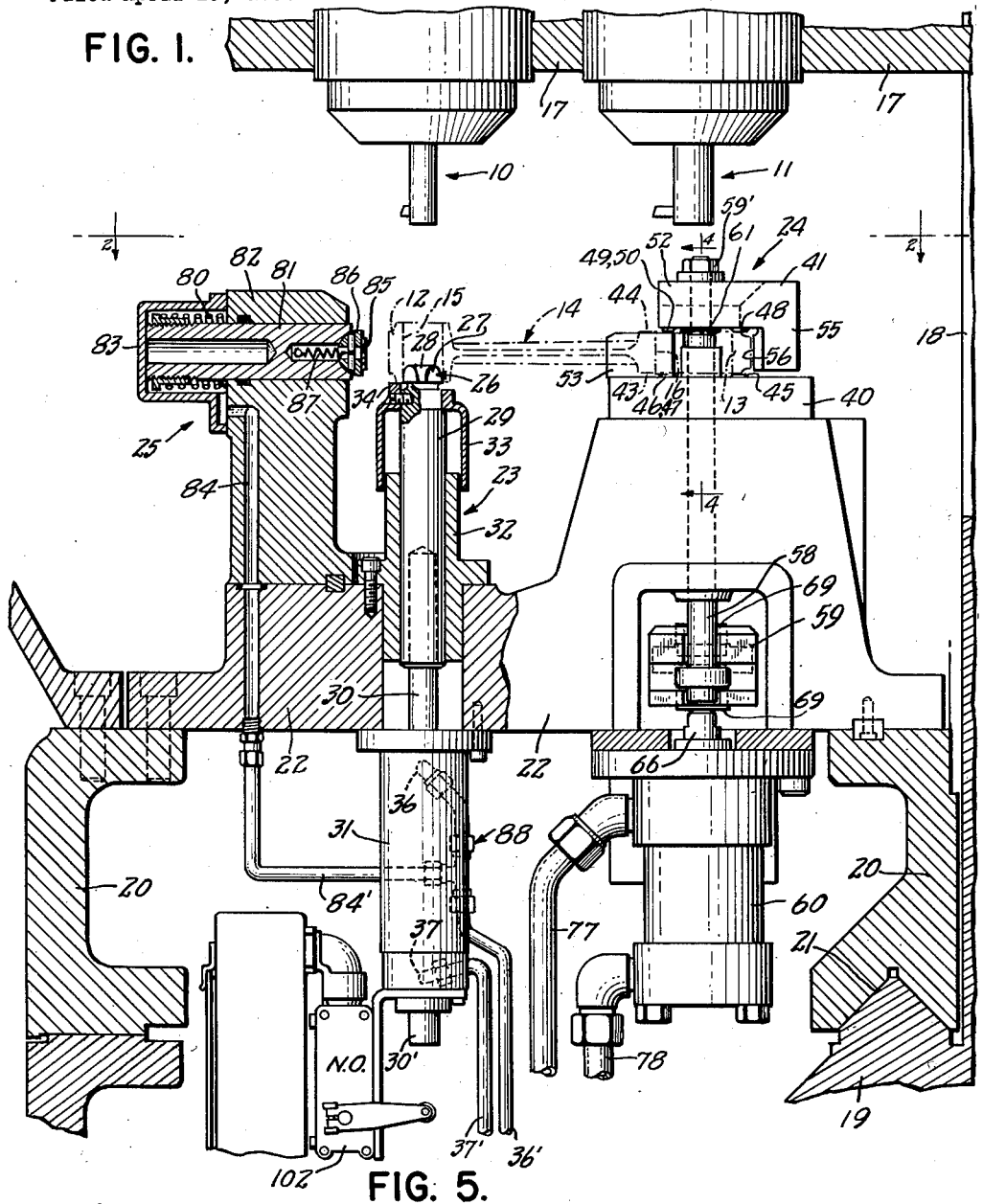
FIG. 1.
FIG. 5.
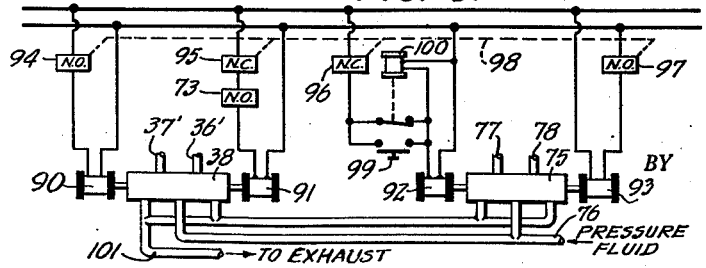
INVENTORS
Gustav R. Carlson
Francis W. Cook, Jr.
BY
ATTORNEYS

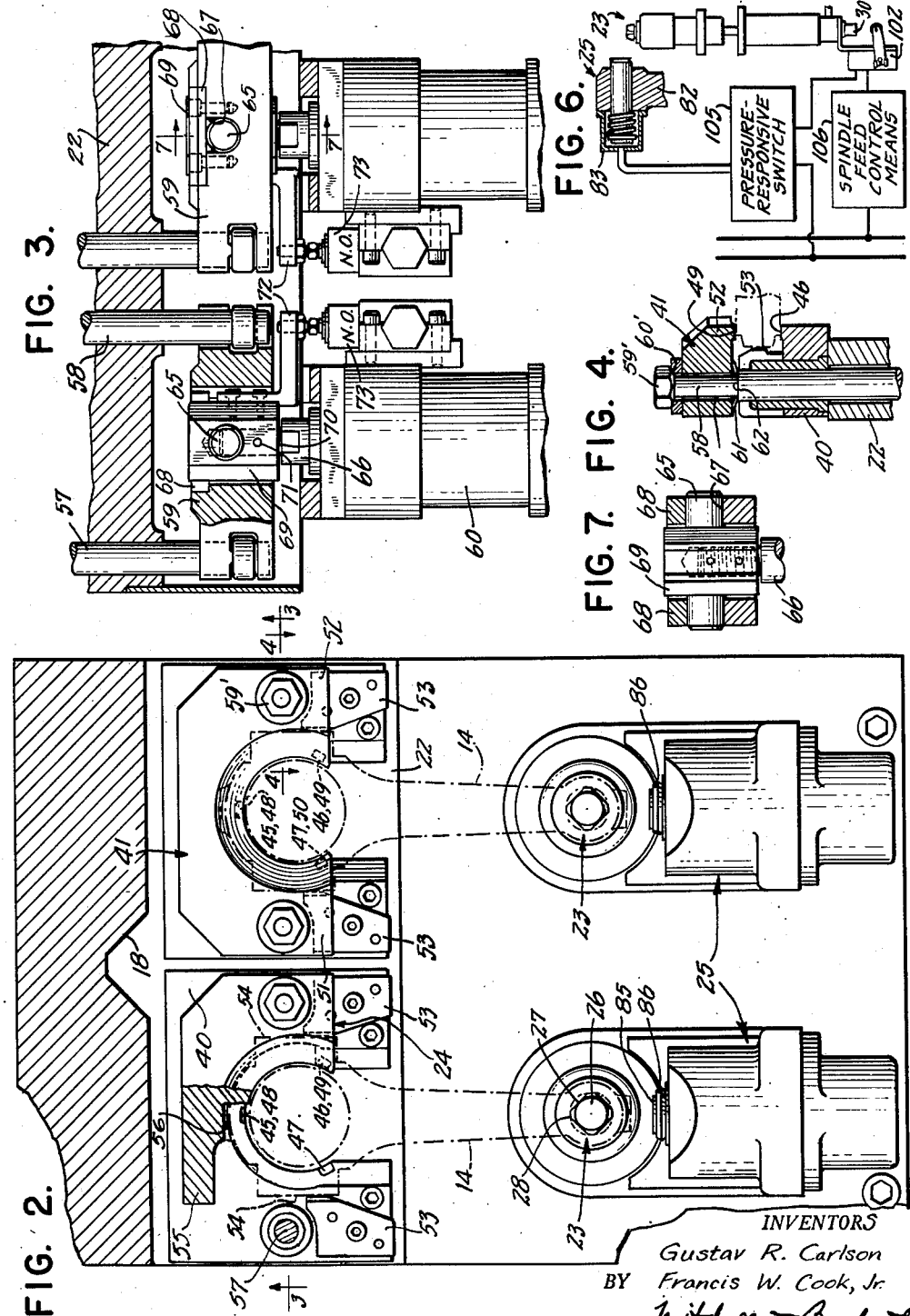

United States Patent Office 2,814,215
Patented Nov. 26, 1957

2,814,215

FIXTURE FOR A BORING MACHINE OR THE LIKE

Gustav R. Carlson, New Britain, and Francis W. Cook, Jr., Hartford, Conn., assignors to The New Britain Machine Company, New Britain, Conn., a corporation of Connecticut Application April 19, 1955, Serial No. 502,318

20 Claims. (Cl. 77—4)

Our invention relates to chucking means, and in particular to means for chucking a connecting rod as, for example, a connecting rod of an internal combustion engine, to receive a boring operation.

It is an object of the invention to provide improved means of the character indicated.

It is another object to provide a means for chucking a connecting rod in such manner that no residual stress will be introduced in the rod by reason of chucking action, so that the respective ends of the rod may be bored on axes which, after release from the chucking means, may be known to be strictly parallel.

It is another object to provide an improved chucking means for a connecting rod whereby assurance may be had that the rod will not be torsionally stressed during chucking.

It is a specific object to meet the above objects with a structure coordinating a plurality of functions to achieve the desired result and with safety-lockout means, whereby boring feeds may not be started until the chuck has been completely set.

Other objects and various further features of novelty and invention will be pointed out or will occur to those skilled in the art from a reading of the following specification in conjunction with the accompanying drawings. In said drawings, which show, for illustrative purposes only, preferred forms of the invention:

Fig. 1 is a side elevation of a boring machine incorporating chucking means of the invention, the elevation being such as to display the separate boring spindles for the respective ends of the connecting rod to be bored, and certain parts being broken-away and shown in vertical section in order to reveal internal constructions;

Fig. 2 is a fragmentary plan view of the chucking mechanism of Fig. 2, as viewed at the plane 2—2 of Fig. 1;

Fig. 3 is an enlarged fragmentary sectional view in the plane 3—3 of Fig. 2;

Fig. 4 is an enlarged fragmentary sectional view in the plane 4—4 of Fig. 2;

Fig. 5 is a diagram schematically indicating electrical and fluid-control connections to the apparatus of Figs. 1 to 4;

Fig. 6 is a diagram schematically indicating parts of a modification; and

Fig. 7 is a fragmentary sectional view in the plane 7—7 of Fig. 3.

Briefly stated, our invention contemplates the stressfree chucked support of a connecting rod (which is to be precision finish-bored at both ends simultaneously) by rigidly clamping only one end of the rod, thereby allowing the other end to derive its support only through cantilever action in the shank of the rod. In relying primarily on cantilevered support, we have found that, since the finish boring is done with a fine feed and a very light chip, relatively weak shock-absorbing or steadying forces are all that are needed in the unclamped end of the rod, in order to dampen or hold the same during a boring operation at the cantilevered end. In conjunction with our clamping means, we provide novel locators and automatic program control, whereby in a single cycle of setting the chuck, the rod is positively oriented to receive boring cuts simultaneously from two spindles working at the respective ends of the rod; the mechanism includes safety means, whereby spindle feed may not be started until all elements of the chuck have been properly actuated to secure the rod.

Referring to Fig. 1 of the drawings, our invention shown in application to a boring machine having two spindles 10—11 carrying boring tools to bore the respective ends 12—13 of a connecting rod 14; the use of two spindles 10—11 applies for each rod 14 to be bored at any time, and in Fig. 2 two rods 14 are shown separately positioned and chucked to receive simultaneous boring operations, as by a double battery of spindles 10—11. The rod 14 may be of conventional construction, as for use in internal-combustion engines, and thus the two ends 12—13 may be connected by a suitably formed shank and rough-bored, as at the end 12, with a wrist-pin bore 15, and at the end 13 with a crankshaft 16. The spindles 10—11 may be driven at high speed (by means not shown) and may be mounted on parallel axes and on a common slide, suggested at 17, for reciprocation along guide means 18 forming part of the frame 19 of the machine. The frame 19 itself may be furnished with a flat top for removably receiving chucking means to support the rod 14; but, in the form shown, a longitudinally slidable frame member 20 is secured along guide means 21 in the frame 19, and it is on the flat upper surface of the frame member 20 that the chucking means is mounted. The table or frame member 20 is moved laterally to move the work holder from beneath the spindles for loading and unloading the work pieces.

In accordance with the invention, our chucking means comprises (for each rod 14 to be bored) means for rigidly securing one end, say the rod end 13; when thus secured, the other end 12 is suitable oriented in alignment with the spindle 10, but said other end 12 derives no clamping support beyond that available through cantilever action of the rod shank. Our clamp is shown to have a single base 22 secured to the frame member 20 and extending between and beyond both spindle axes 10—11. A locator 23 is mounted on the base 22 in alignment with the spindle axis 10, and the rigid clamp mechanism 24 is mounted on the base 22 in alignment with the spindle 11. Shock-absorbing means 25 for steadying the cantilevered end of rod 14 is also shown mounted on the base 22. The locating means 23, the clamp 24, and the shock absorber 25 are all preferably actuable in a single programed cycle of operation, as will more clearly appear.

The basic locating element of the device 23 is shown at 26 and is essentially a plug gage to fit the rough-machined bore 15 of the rod 14, for orientation purposes prior to setting the clamp means 24. The plug locator 26 may be of right-cylindrical shape closely fitting the bore 15, but since a circumferentially continuous fit is not required, we have indicated our preference that the plug 26 be slabbed off, as at 27 (see Fig. 2), so as to define a plurality of angularly spaced locating feet 28 to ride the bore 15.

Before the clamp 24 is set, the locating means 23 is preferably in the position shown in Fig. 1, that is, with the plug 26 extended to receive the bore 15, but after setting clamp 24, locator 23 is automatically retracted. For this reason plug 26 may be formed as a part of or carried by a rod 29 connected to a stem 30, reciprocally actuated as by a double-acting hydraulic cylinder 31. The rod 29 is shown guided in a fixed vertical guide 32, and a skirt 33 (carried at the head end of the rod 29) overlaps the guide 32 to prevent accumulations of foreign matter, as will be understood. We have shown a locating lug 34 on the skirt 33 and adjacent the plug 26 so that, when a new rod 14 is being inserted in the machine, the cantilevered end 12 thereof may not only be located by the plug 26, but may rest on the lug 34 to preserve a proper horizontal orientation while the clamp is being set. The cylinder 31 may include fluid-supply connections, as 36 at the tail end and 37 at the head end, for supply lines 36'-37', respectively. Control for the pressure fluid admitted in lines 36'-37' is derived from suitable valve means 38 shown schematically in Fig. 5 and to be described later in detail.

The clamping mechanism 24 comprises essentially a fixed part or base 40 (mounted on the base 22) and a movable part or jaw 41. The base 40, in effect, provides a reference surface perpendicular to the spindle axis 11 and for receiving one of two substantially plane-parallel rod surfaces 43—44, representing axial ends of the hub at the clamped end 13 of the connecting rod. Actually, it is not necessary to provide a single continuous supporting surface on the base 40, and we have indicated our preference that this supporting surface be defined by three suitably finished feet 45—46—47 (see Figs. 1 and 2) angularly spaced about the boring axis. In like manner, the jaw member 41 may be formed on its underside with a clamping surface defined by three angularly spaced points of support 48—49—50.

The movable member or jaw 41 may extend completely around the bore 16, but it is sufficient to break away one side to define a fork, with arms 51—52 embracing generally opposite regions around the axis of the bore 16. To assist in receiving and initially locating an inserted rod 14, the back end of the movable member 41 may integrally carry a depending lug 55, with a locating surface 56 preferably finished so as to clear the rod end 13 when the locating plug 26 has entered the bore 15; the extent of this clearance, however, is preferably small enough so that it will sufficiently locate the rod to permit easy accommodation of the bore 15 on the rounded end of the plug 26, as will be understood. For lateral location of the clamped rod end, we provide locating lugs 53 secured to the base 40 and spaced to engage ground-off parallel side faces 54 of the rod 14.

To provide equalized clamping pressures, two like movable members are used to actuate the opposite arms 51—52 of the jaw 41; these members are shown as rods 57—58 (see Fig. 3) differentially connected by a lever 59 to actuating means, such as a hydraulic cylinder 60. In order to allow for slight departures from parallel relation between the surfaces 43—44 of the rod end 13, we provide a slight radial clearance between the rod 58 and the bores 58' of jaw 41, and the head or nut 59' securing the rod 58 to the jaw 41 is formed for self-aligning action, as at seat 60'. Belleville-spring means 61 may be provided between a shoulder 62 of the rod 58 and the underside of the jaw 41, so as resiliently to urge the jaw 41 away from chucking engagement when the rod 58 is thrust upwards in an unchucking operation.

In the form shown (see Figs. 3 and 7), the differential lever 59 is pivoted to a trunnion block 69 which has laterally projecting lugs or bearings 65, riding in notches 67 of the lever 59. Lever 59 is held in assembled relation with trunnion block 69 by a retaining member 68. Trunnion block 69 is shown secured to the threaded end 70 of the actuating stem 66, and a setscrew 71 holds the secured relation. A limit-switch trip lug 72 is adjustably carried on one side of the trunnion block 69 to provide a means for actuating a normally-open limit switch 73, for use in the programed operation of our device. Actuation of the clamp means may be effected by a control valve 75 which may resemble the control valve 38 and which may include means for reversibly supplying pressure fluid, as from the supply line 76 to lines 77—78, communicating respectively with the tail and head ends of the cylinder 60 (see Figs. 1 and 5).

The shock-absorber mechanism 25 is in the form shown in Fig. 1, also fluid controlled, and with single action, reliance being had on resilient means 80 to retract the same. The absorber may comprise essentially a piston or stem 81 guided in a base or standard 82, the latter being fitted with a head or cap 83 to define an actuating space for reception of pressure fluid in line 84. Contact of shock absorber 25 with the work is preferably made through self-aligning means, such as a self-aligning member 86 at the projected end of member 81; an internal spring 87 is shown resiliently holding the self-aligning member 86 in place. The face of the self-aligning member may be provided with resilient material, such as a neoprene pad 85. For actuating purposes, a line 84' may be connected at a T-fitting 88 to the line 36', by way of which retracting pressures are applied to the locating means 23. Thus, whenever the locator 23 is retracted, fluid forces are supplied to drive the shock absorber 25 into engagement with the cantilevered end 12 of the rod 14. The force of such engagement need not be great, and it is sufficient that the shock absorber 84 perform merely the function of resisting development of transverse oscillations in the cantilevered end of the rod 14; it thus serves merely as a damping mechanism and not as a chuck.

The interrelated functions of our device will be better appreciated from the description of a typical cycle of operations, with particular reference to the diagram of Fig. 5. Both valves 38—75 may be equipped with separate solenoids, as at 90—91 for the valve 38 and 92—93 for the valve 75, determining positive actuation into one or the other of the two control positions for each of these halves. Limit switch 73 is shown in the circuit to solenoid 91, and ganged limit switches 94—95—96—97 are serially connected in their respective solenoid circuits; the ganged connection 98 between these switches schematically indicates that the switches function simultaneously at the completion of a feed cycle of the spindle slide 17. Switches 94—97 are, as indicated, of the normally open variety, and switches 95—96 are of the normally closed variety.

When initiating a cycle of boring operations, said cycle including the cycle of setting the clamping means of our invention, means (not shown) will be understood to be operative to establish the switches 94—95—96—97 in their described normal positions. Thus, when feed movements start, these switches do not become actuated; or, rather, once the cycle has been started, these switches are in (or are caused to be in) the normal conditions described.

When a new rod 14 is to be inserted in the machine, the clamp 24 will be in the open position, allowing ample clearance for insertion of the rod end 13, and the locator as will be projected upwardly to allow the cantilevered end 12 to rest on the lug support 34. The cycle of operations may be commenced by operating the manual push-button 99 (Fig. 5) and, once this button has been operated, a hold-in relay 100 maintains a supply of energizing potential to the solenoid 92. In this condition, valve 75 is actuated to supply pressure fluid in line 77 to the tail end of cylinder 60, allowing fluid at the head end of cylinder 60 to return in line 78 to the exhaust line 101. This distribution of pressure fluid results in actuation of the jaw 41 downwardly, firmly supporting the parallel surfaces 43—44 of the rod 14 at the opposite locating feet 45—46—47 and 48—49—50 of the clamp. When thus clamped, the relation of the lug 34 (at locator 23) to the cantilevered end 12 of the rod is preferably one of slight axial clearance so that, by reason of clamping action, there need be no residual stress introduced at 34 in the support of the rod 14.

Each clamp 24 is fully set when its trip lug 72 on the trunnion block 69 reaches a down position and switch 73 is actuated from its normally open condition, thereby completing the circuit to solenoid 91. As a result, valve 38 is actuated to supply pressure fluid in line 36′, and it will be recalled that, under these conditions, the locator 23 is immediately retracted and the shock absorber 25 projected into holding relation with the work.

When the locator 23 is fully retracted, the tail end 30′ of the stem 30 is projected fully downward and into actuating relation with normally open switch means 102 (see Fig. 1). Separate switch means 102 may be provided for each pair of rod-boring spindles in a multiple-rod boring application as presently shown, so that when all such switches 102 are actuated in series relation with control means (not shown) determining initiation of a feed of the spindles, the feed may proceed. The spindles 10—11 may be continuously rotating and, therefore, when the slide 17 is reciprocated in a feeding cycle, both boring operations at 15—16 may proceed simultaneously, for all rods 14 accommodated by the machine. Boring is completed upon full retraction of the slide 17, at which time the ganged switches 94—95—96—97 will be operated (by means not shown) to reverse the position of the valves 38—75. In this reversed condition of these valves, the clamp 24 is immediately released, the shock absorber 25 is retracted, and the locator 23 is projected to the position shown in Fig. 1.

In Fig. 6, we show a slight modification incorporating, as an additional safety feature, a pressure-responsive switch 105 in series with the switch 102. The switch 105 may respond to achievement of a given threshold pressure at the head end 83 of the shock absorber 25, and this threshold pressure may definitely represent that pressure at which the shock absorber is known to be in engagement with the cantilevered end 12 of the rod to be bored. Both switches 102—105 may be in series with the spindle-feed control means 106 as shown.

It will be appreciated that we have described an ingenious means whereby both ends of a connecting rod may be supported without stress so as to permit simultaneous boring of both the wrist-pin bore and the crankshaft bore, with the assurance that, even when released from the chucking means, the bored axes will be strictly parallel. This assurance means the production of engines of greater precision and capable of longer life. Furthermore, our device permits speedier production because it eliminates the need for checking all finished connecting rods for parallel alignment of bore axes; our device also eliminates the need for shank-twisting operations after finish-boring, in an effort to render the bore axes parallel.

While we have described our invention in detail for the preferred forms shown, it will be understood that modifications may be made without departing from the scope of the invention as defined in the claims which follow.

We claim:

1. A machine for boring a connecting rod having a crankshaft end connected by a shank to a wrist-pin end, said rod having opposed substantially plane-parallel axial-end surfaces at one of said ends, a boring spindle on a boring axis, clamping means rigidly securing said end and acting on both said surfaces and orienting one of said surfaces perpendicular to said boring axis, whereby the other end of said rod derives essentially only cantilever support through the shank of said rod, and steadying means acting generally longitudinally of the shank of said rod and retractably poised to engage said other end of said rod.

2. In a machine for boring a connecting rod having a crankshaft end connected by a shank to a wrist-pin end, two spindles on parallel axes and fitted to bore the wrist-pin bore and the crankshaft bore respectively, clamping means rigidly securing the crankshaft end of said rod in alignment with the spindle for boring the crankshaft bore therein, said clamping means acting only on said crankshaft end and orienting the other end of said rod in alignment with the wrist-pin boring spindle, whereby said wrist-pin end derives essentially only cantilevered support through the shank of said rod, and means steadying the wrist-pin end of said rod against transverse movement without deflecting the same from the orientation derived through cantilevered support from said clamping means.

3. In a machine for boring a connecting rod having a crankshaft end connected by a shank to a wrist-pin end, a wrist-pin-boring spindle and a crankshaft-boring spindle on parallel axes and disposed to bore the respective ends of said rod in a single feeding stoke, locating means for one of said bores and clamping means rigidly securing the other end of said rod in alignment with one of said boring spindles, said clamping means acting only on said other end of said rod; whereby, when said clamping means has been set, said locating means will have located the other bore in alignment with the other boring spindle; and means for retracting said locating means after setting said clamping means, whereby the rod end at said other bore will derive essentially only cantilevered support through the shank of said rod.

4. In a machine for boring a connecting rod having a crankshaft end connected by a shank to a wrist-pin end, a wrist-pin-boring spindle and a crankshaft-boring spindle on parallel axes and disposed to bore the respective ends of said rod in a single feeding stroke, locating means for one of said bores and clamping means rigidly securing the other end of said rod in alignment with one of said boring spindles, said clamping means acting on said other end independently of said shank; whereby, when said clamping means has been set, said locating means will have located the other bore in alignment with the other boring spindle; means for retracting said locating means after said clamping means has been set; and means steadying the cantilevered end of the clamped rod.

5. In a machine for boring a connecting rod having a crankshaft end connected by a shank to a wrist-pin end, a wrist-pin-boring spindle and a crankshaft-boring spindle on parallel axes and disposed to bore the respective ends of said rod in a single feeding stroke, locating means for one of said bores and clamping means rigidly securing the other end of said rod in alignment with one of said boring spindles; whereby, when said clamping means has been set, said locating means will have located the other bore in alignment with the other boring spindle; means for retracting said locating means after said clamping means has been set; and means steadying the cantilevered end of the clamped rod, said last-defined means including retractable shock-absorbing means movable into contact with the cantilevered end of said rod and disposed to resist lateral oscillations in the cantilevered end of said rod during a boring operation; and means coordinating the retraction of said locating means and the application of said shock-absorbing means with respect to the cantilevered end of said rod.

6. In a machine for boring a connecting rod having a crankshaft end connected by a shank to a wrist-pin end, said rod having opposed substantially plane-parallel axial-end surfaces at one of said ends, two boring spindles on parallel axes spaced by the bore-spacing in said connecting rod, frame means supporting said spindles, clamping means on said frame means and including a base surface to receive one of the parallel surfaces at said end of said rod, movable clamping members spaced on opposite sides of the bore axis at said one end and actuable to bind against the other of said parallel surfaces, whereby once clamped, the other end of said rod may derive essentially only cantilevered support through the shank of said rod with the bore axis at the cantilevered end oriented in alignment with the bore axis of the other spindle, and means resiliently applied to the cantilevered end of said rod to steady the same against lateral oscillation during a boring operation.

7. A machine according to claim 6, in which said clamping means includes separate members separately acting to secure the opposite sides of the other parallel face of the clamped rod end, a single actuating means, and a differential connection between said single actuating means and said separate members.

8. A machine according to claim 6, in which said clamping means includes side locators spaced equally on opposite sides of the bore axis at the clamped end for orienting the clamped end prior to setting the clamp.

9. In a machine for boring a connecting rod having a crankshaft end connected by a shank to a wrist-pin end, said rod having opposed substantially plane-parallel surfaces at one of said ends, two boring spindles on parallel axes spaced by the bore spacing in said connecting rod, frame means supporting said spindles, clamping means on said frame means and including a base surface to receive one of the parallel surfaces at said one end of said rod, movable clamping members spaced on opposite sides of the bore axis at said one end and actuable to bind against the other of said parallel surfaces, whereby once clamped, the other end of said rod may derive essentially only cantilevered support through the shank of said rod with the bore axis at the cantilevered end oriented in alignment with the bore axis at the cantilevered end oriented in alignment with the bore axis of the other spindle, means resiliently applied to the cantilevered end of said rod to steady the same against lateral oscillation during a boring operation, and means responsive to a setting of said clamping means for controlling application of said steadying means to the cantilevered end of said rod.

10. In a machine for boring a connecting rod having a crankshaft end connected by a shank to a wrist-pin end, two boring spindles on parallel axes, frame means supporting said spindles, clamping means for clamping one end of said rod in alignment with one of said spindles and including an actuator for setting said clamping means, locating means engageable with the other end of said rod for preliminarily aligning said other end with the other boring axis before and while said clamping means is being set, said locating means including an actuator for retracting the same, and means coordinating the retraction of said locator with the setting of said clamping means, said last-defined means including means responsive to a displacement necessary to achieve setting of said clamping means.

11. In a machine for boring a connecting rod having a crankshaft end connected by a shank to a wrist-pin end, two boring spindles on parallel axes, frame means supporting said spindles, clamping means for clamping one end of said rod in alignment with one of said spindles and including an actuator for setting said clamping means, locating means engageable with the other end of said rod for preliminarily aligning said other end with the other boring axis before and while said clamping means is being set, said locating means including an actuator for retracting the same, and means coordinating the retraction of said locator with the setting of said clamping means, said last-defined means including means responsive to a displacement necessary to achieve setting of said clamping means, and shock-absorbing means including an actuator for placing the same in steadying relation with the cantilevered end of said rod, said coordinating means including means responsive to a setting of said clamping means for actuating said shock-absorbing means into engagement with said rod.

12. A machine according to claim 11, and including means responsive to retraction of said locating means for enabling a feed-control mechanism for said spindles.

13. A machine according to claim 11, and including means responsive to completion of a feed cycle of said spindles for substantially simultaneously releasing said clamping means.

14. A machine according to claim 11, and including means responsive to completion of a feed cycle of said spindles for substantially simultaneously releasing said clamping means and projecting said locating means.

15. A machine according to claim 11, and including means responsive to completion of a feed cycle of said spindles for substantially simultaneously retracting said shock-absorbing means.

16. A machine according to claim 11, and including means responsive to completion of a feed cycle of said spindles for substantially simultaneously releasing said clamping means and disengaging said shock absorbing means.

17. A boring machine having a plurality of spindles for finish-machining spaced bores of an elongated work piece, work locators for positioning the bores of said work piece in alignment with said spindles, clamping means for rigidly securing said work piece only at one end, and self-aligning means for resiliently steadying said work piece at its opposite end during the boring operation.

18. A boring machine provided with a work support for holding elongated work pieces having spaced-apart bores, spindles for precision-machining said bores, said work support having work-locating means for positioning the bores of said work pieces in alignment with said spindles, clamping means for rigidly securing said work piece at one end, and resilient self-aligning means acting longitudinally against the opposite end of said work piece for steadying said opposite end during the boring operation.

19. A boring machine provided with a work support for holding elongated work pieces having spaced-apart bores, spindles for precision-machining said bores, retractable work-locating means engaging a bore of said work piece to position said bores in alignment with said spindles, clamping means on said work support for rigidly holding said work piece at one end, self-aligning steadying means on said support engaging the opposite end of said work piece to steady said last-mentioned end during the machining operation, and means controlled by said clamping means for substantially simultaneously retracting said work-locating means and advancing said steadying means.

20. In a machine for simultaneously finish-boring spaced bores of an elongated work piece, two spindles on parallel axes spaced in accordance with the spacing of said bores, clamping means rigidly securing said work piece at one of said bores wtih said one bore in alignment with one of said spindles, said clamping means orienting the other of said bores in alignment with the other spindle but providing no clamping support in the region of said oher bore, whereby said work piece derives cantilevered support in the vicinity of said other bore, and means steadying the cantilevered part of said work piece against transverse movement and independently of said clamping means.

References Cited in the file of this patent
UNITED STATES PATENTS 1,744,095    Auten _____ Jan. 21, 1930